United States Patent [19]
Tucker

[11] 3,810,092
[45] May 7, 1974

[54] WARNING AND DISTRESS SIGNAL DEVICE FOR A DISABLED VEHICLE

[76] Inventor: Charles M. Tucker, 59 Twelveoak Hill Dr., San Rafael, Calif. 94903

[22] Filed: Nov. 24, 1972

[21] Appl. No.: 309,071

[52] U.S. Cl............. 340/107, 40/129 C, 340/114 B
[51] Int. Cl. ........................... B60q 1/00, G09j 7/00
[58] Field of Search ....... 340/22, 81 R, 84, 87, 107, 340/114 R, 114 B; 40/65, 125 H, 129 R, 129 A, 129 C; 116/28, 63 P

[56] References Cited
UNITED STATES PATENTS

| | | | |
|---|---|---|---|
| 1,574,538 | 2/1926 | Crosby | 340/146 UX |
| 2,194,818 | 3/1940 | Book | 340/321 UX |
| 2,613,463 | 10/1952 | Transue | 40/124 CX |
| 3,092,826 | 6/1963 | Klingner | 340/331 |
| 3,139,611 | 6/1964 | Fleming | 340/321 |
| 3,208,173 | 9/1965 | Shank | 40/129 C |
| 3,497,980 | 3/1970 | Brown et al | 40/129 R |
| 3,604,133 | 9/1971 | Hawa | 40/65 |
| 3,623,254 | 11/1971 | Parish | 40/129 C |

Primary Examiner—Donald J. Yusko
Attorney, Agent, or Firm—Melvin R. Stidham, Esq.

[57] ABSTRACT

A warning and distress signal device for a disabled vehicle comprising a pair of brightly colored panels attached along their top edges and having rubber suction cup feet for mounting them on the vehicle roof. A series of slides behind one of the panels carries card signs which may be moved to extend laterally of the panels to expose to passing motorists words citing the needs, e.g. "gas," "aid," etc. of the driver.

5 Claims, 3 Drawing Figures

PATENTED MAY 7 1974　　　3,810,092
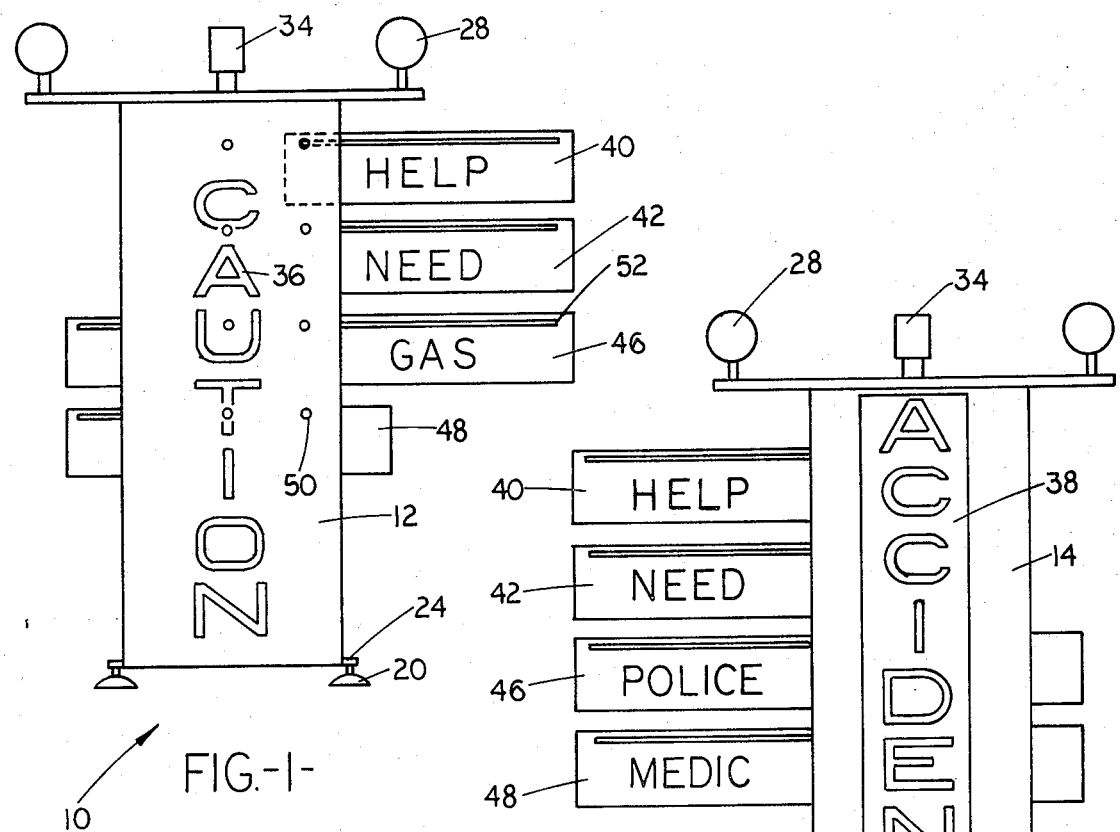
FIG.-1-
FIG.-2-
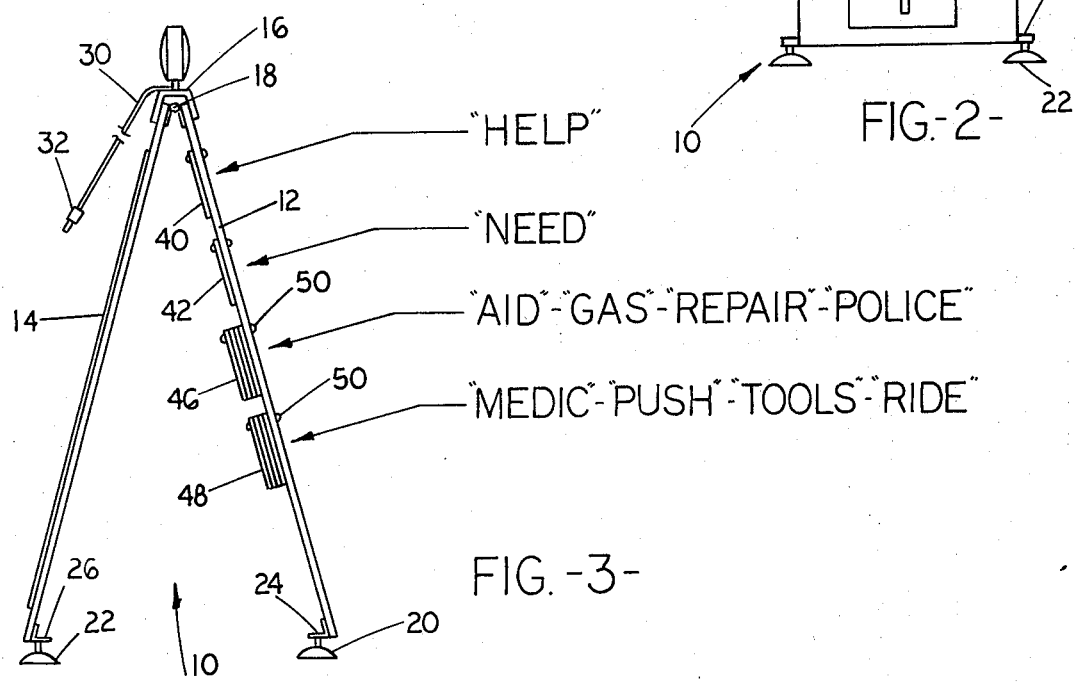
"HELP"
"NEED"
"AID"-"GAS"-"REPAIR"-"POLICE"
"MEDIC"-"PUSH"-"TOOLS"-"RIDE"
FIG.-3-

WARNING AND DISTRESS SIGNAL DEVICE FOR A DISABLED VEHICLE

BACKGROUND OF THE INVENTION

All too often, an accident occurs or an automobile becomes disabled in a remote stretch of highway wherein prompt effective assistance is inaccessible. Passing motorists are often reluctant to stop, particularly if they are not aware that an emergency situation exists. Moreover, when an accident or automobile failure occurs, the disabled automobile may itself constitute a serious traffic hazard, even though the driver may be successful in pulling the automobile off of the roadway. Commonly in such situations, flares are placed behind the car to warn on-coming motorists. They are generally placed at ground level and may not become visible to an approaching driver until it is too late for him to avoid a collision.

OBJECTS OF THE INVENTION

It is an object of this invention to provide a distress signal device for a disabled automobile which is readily visible to on-coming traffic.

It is a further object of this invention to provide a distress signal and message device for a disabled vehicle designed to advise passing motorists of the extent and nature of the disability.

It is a further object of this invention to provide a distress signal device for a disabled vehicle capable of presenting a message to passing motorists of the needs of the disabled vehicle.

It is a further object of this invention to provide a clearly visible warning device for traffic approaching a disabled vehicle.

It is a further object of this invention to provide a warning device for traffic approaching a disabled vehicle which is placed at a sufficient height to be readily visible to oncoming drivers.

Other objects and advantages of the invention will become apparent from the description to follow, when read in conjunction with the accompanying drawing.

BRIEF SUMMARY OF THE INVENTION

In carrying out this invention I provide an effective signal and warning device for use with a disabled vehicle comprising a pair of fairly rigid panels which are secured together along their upper edges and which have rubber suction cup feet at their lower edges for temporary attachment to the roof of the disabled vehicle. The panels are of bright, readily visible colors such as red and yellow, and slidably carried on at least one of the panels is a plurality of message sign cards, each of which carries a word designating a particular need of the disabled vehicle.

Each message word is carried on both sides of a card slide in light reflective material so it has to be visible even after dark. The sign cards are slidable from their normal positions behind the panel to exposed positions wherein they extend laterally therefrom. As an example, the top sign may carry the word "help" and the second sign may carry the word "need." Below the second slide may be one or more groups of slides whereby one may extend selectively the particular need required. For example, one series of slides may carry the words "aid," "gas," "repair" and "police" and another series may carry the words "medic," "push," "tools" and "ride." Carried at the top of the panel assembly is one or more warning lights having an electric conductor adapted to be plugged into the cigarette lighter. Where permitted by law, the conductor may connect into a circuit interrupter which causes the lights to flash.

BRIEF DESCRIPTION OF THE DRAWING

FIG. 1 is a front elevation view of a distress signal and warning device embodying features of this invention;

FIG. 2 is a back elevation view of the signal and warning device; and

FIG. 3 is a side view of the signal and warning device.

DESCRIPTION OF A PREFERRED EMBODIMENT

Referring now to the drawing, the distress signalling and warning device 10 of this invention comprises front and rear panels 12 and 14 each of which may be formed of plastic, sheet metal or any other suitable fairly rigid material. The panels are secured together along their upper edges, as by attaching with any suitable means (not shown) to an inverted channel 16. The panels may be hinged together at 18 so that they may be pivoted from a collapsed position, for storage in an automobile trunk, to the A-frame configuration (FIG. 3) when in use. The hinge connection 18 may be omitted if the panels are sufficiently flexible.

Suction cup feet 20 and 22 are carried on the lower edges of the panel as by securing them to angle members 24 and 26 disposed there along such lower edges. The suction cup feet enable the signal and warning device to be mounted on the roof of an automobile or other vehicle without damaging the finish. Placing the device on the roof of the vehicle enhances its visibility.

Carried on the top inverted channel 16 is a pair of signal lights 28 including an electric conductor 30 carrying a conventional plug 32 adapted for the receptacle of the automobile cigarette lighter. Also connected into the circuit of the electrical conductor, where permitted by law, is a conventional circuit interrupter 34 which causes the light to flash. On one of the panels 12 facing the on-coming traffic the word "caution" is applied in letters of highly visible material. For example, the letters 36 may be formed in light reflective tape so as to be readily visible in the headlights of on-coming traffic at night. The panels themselves 12 and 14 may be of reflective material and, in any event, should be of highly visible colors such as yellow or red. In the event that the automobile disability is as a result of an accident, a separate panel 38 bearing the word "accident" in highly visible light reflective letters may be suspended or otherwise secured to the other panel 14 to advise oncoming traffic approaching from the other way.

Slidably carried on at least one of the panels 12 is a series of message cards 40, 42, 46 and 48 which are designed to advise on-coming traffic of the particular needs of the disabled vehicle and its occupants. For example, I have shown groups of four slide cards which may be carried on the back of the panel 12 as by engagement of screw members 50 in slots 52. The uppermost slide card 40 contains the word "help" in highly visible, light reflective material. This slide card may be moved from its normal, hidden position behind the panels 12 and 14 to an exposed position shown in FIGS. 1 and 2 wherein it extends laterally of the panels to expose the message word on both sides of the card 40. The second slide card 42 contains the word "need" and each of the two lower slides contains a plurality of word cards 46 and 48 which may be extended selectively to specify the particular need being sought. For example, the first of these two series of signs 46 may contain the words "aid," "gas," "repair" and "police" and the second series of signs 48 may contain the words "medic," "push," "tools" and "ride."

In operation, in the event of a mechanical breakdown on the highway, the driver of the disabled vehicle first attempts to move the vehicle off onto the shoulder of the road. Then, the distress signal and warning device 10 is taken from the trunk of the automobile, spread to the divergent "A" position shown in FIG. 3 and attached to the roof of the vehicle by application of the suction cup feet 20 and 22. The conductor plug 32 is inserted into the cigarette lighter receptacle of the automobile to illuminate the warning lights 28 to serve as a warning for on-coming traffic. Then, the driver extends the sign cards 40 to 46 as required to spell out his needs. Accordingly, he will first extend the top cards to advise that he is seeking both help and a need. Then, if the disability is due simply to running out of gas, he will extend the cards spelling "gas" and "ride".

Thus, the device of this invention gives clear warning to on-coming traffic that there is an obstacle to be avoided in the roadway ahead; it gives clear evidence to on-coming traffic that the vehicle is, in fact, disabled and in need of help; and it advises on-coming traffic of particular needs being sought. An on-coming motorist is obviously more likely to stop to lend aid if he is aware that aid is actually required.

While this invention has been described in conjunction with preferred embodiments thereof, it is obvious that modifications and changes therein may be made by those skilled in the art without departing from the spirit and scope of this invention.

What is claimed as invention is:

1. A warning and distress signal device for a disabled vehicle comprising:
   front and rear panels;
   means connecting said panels along the upper edges thereof;
   means at the lower edges of said panel for temporarily attaching them to a surface on the vehicle with said panels in downwardly divergent relationship with said front panel facing in the direction of oncoming traffic; and
   a plurality of word signs slidably mounted on the rearward side of one of said panels for movement between a hidden position between said panels and an exposed position extending laterally therefrom;
   a word expressing a driver need being applied with reflective material to both sides of each of said signs;
   said signs being slidable selectively to expose to passing motorists words citing the needs of the driver of the disabled vehicle.

2. The signal device defined in claim 1 wherein:
   said panels and said sign slides are of highly visible colors.

3. The signal device defined by claim 1 including:
   a signal light carried on said panels; and means connecting said signal light to a source of electricity.

4. The signal device defined by claim 3 wherein:
   said connecting means comprises an electric conductor cord; and
   a plug on said cord adapted to be received in the cigarette lighter receptacle of the vehicle.

5. The signal device defined by claim 4 including:
   a flasher connected in said conductor cord.

* * * * *